June 3, 1969  C. W. SAVITZ  3,448,238
STUD WELDING TOOL WITH INDEXING MECHANISM
Filed March 26, 1965  Sheet 1 of 3
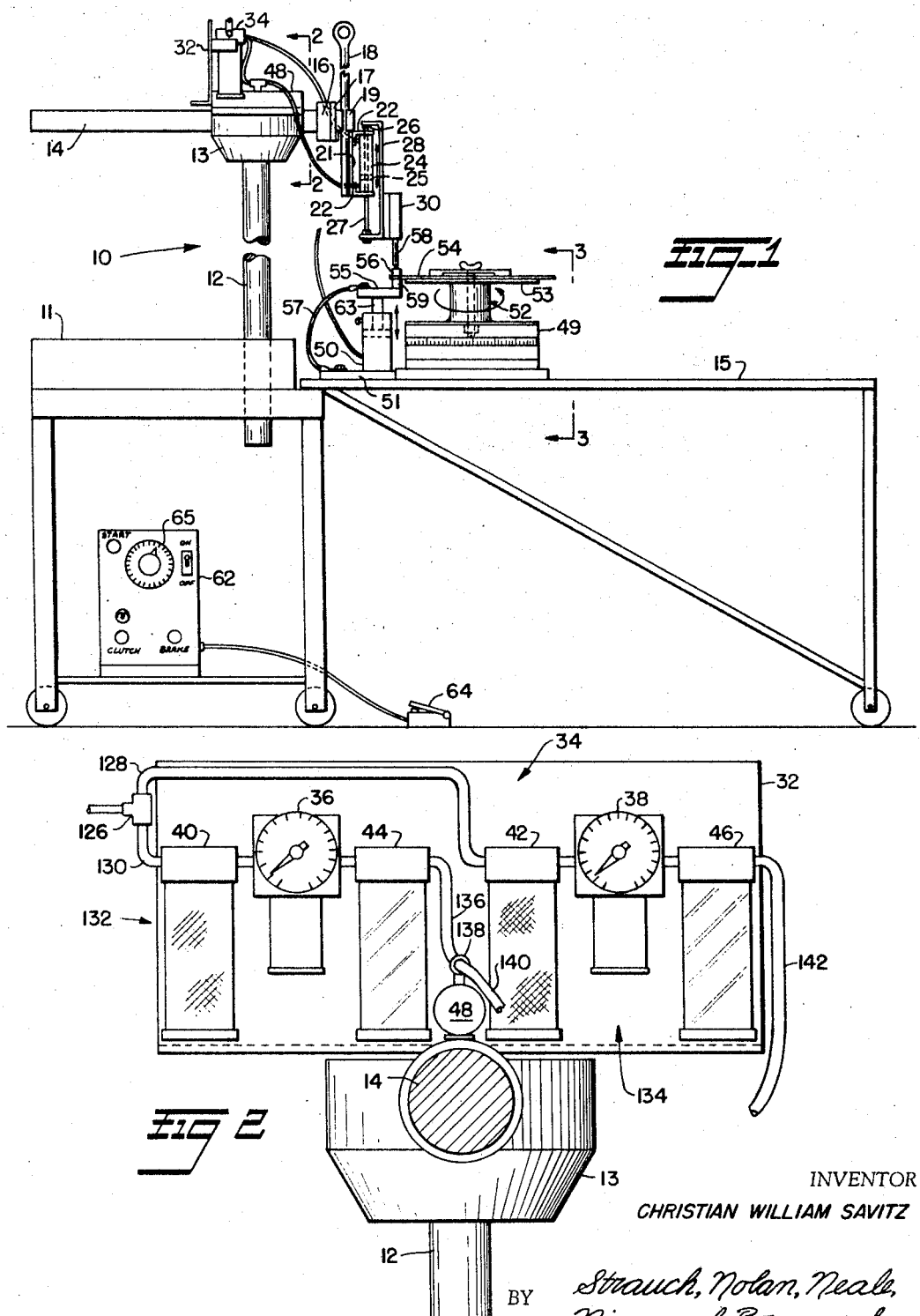
INVENTOR
CHRISTIAN WILLIAM SAVITZ
BY Strauch, Nolan, Neale,
Nies and Bronaugh
ATTORNEYS

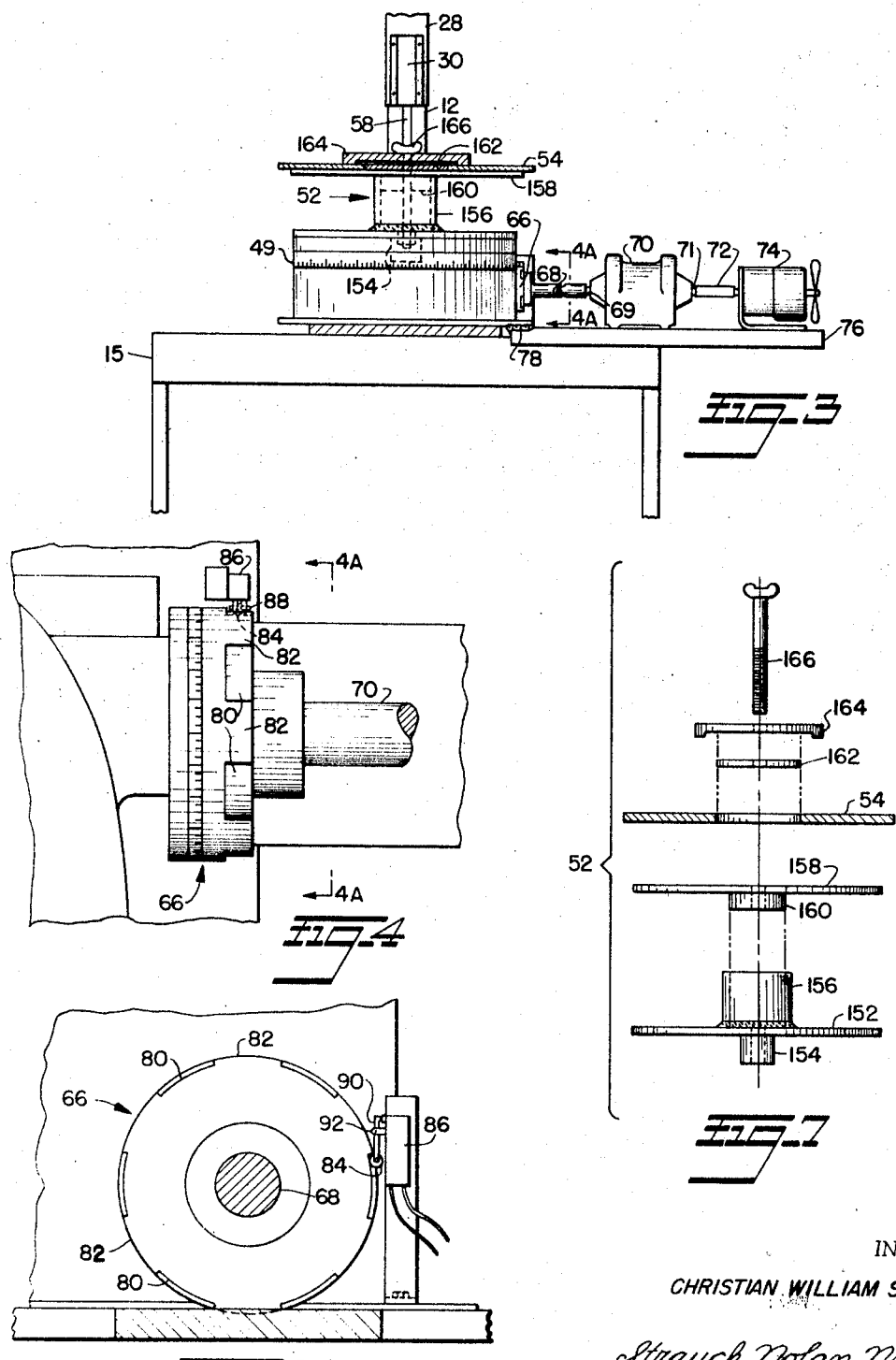

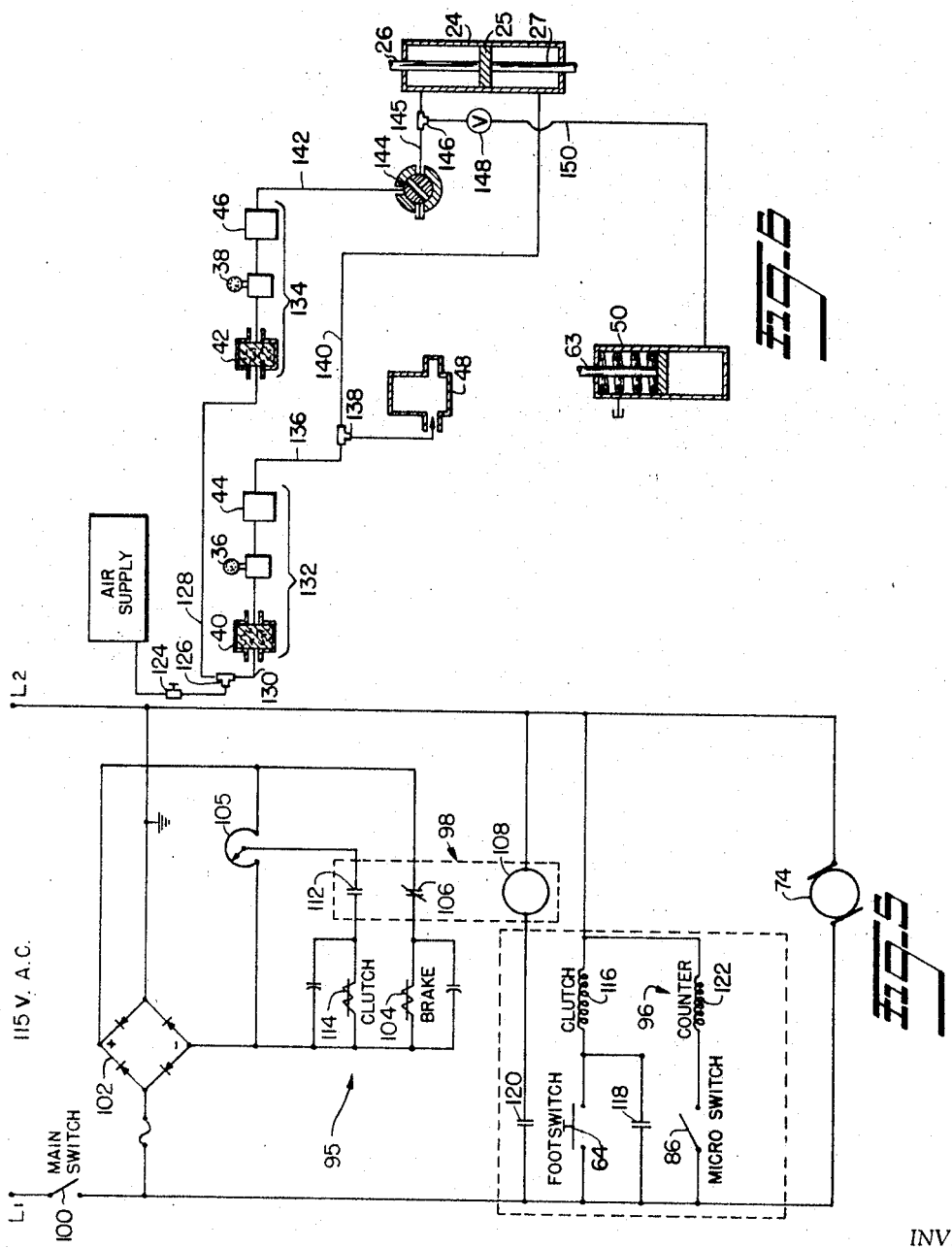

United States Patent Office 3,448,238
Patented June 3, 1969

3,448,238
STUD WELDING TOOL WITH INDEXING MECHANISM
Christian W. Savitz, East Cleveland, Ohio, assignor to North American Rockwell Corporation, a corporation of Delaware
Filed Mar. 26, 1965, Ser. No. 442,899
Int. Cl. B23k 9/20, 9/12, 11/14
U.S. Cl. 219—107
6 Claims

ABSTRACT OF THE DISCLOSURE

Apparatus for successively welding a number of studs or like attachments to a disc-like workpiece. The workpiece is carried by a rotatable carriage which is automatically indexed to bring the parts into proper position for welding. The welding head and carriage are fully adjustable to accommodate a variety of workpieces. A ground path is provided which protects the carriage against current flow and includes an element for supporting the workpiece to prevent distortion.

---

The present invention relates basically to improvements in welding machines and more particularly to improvements in the mounting structures for the welding gun and workpieces by which the welding gun and workpieces can be rapidly and accurately relatively positioned for effective successive welds on like and similar workpieces. Certain aspects of this invention, such as the workpiece indexing structure, are believed to be of more general applicability such as for use in drill pieces, punch presses, milling machines and the like.

In stud welding machines as heretofore constructed, there has been very little if any flexibility in the positioning of the welding gun to define a work station and it has been necessary to manually position the workpiece at the work station for each welding operation that is to be performed. This is very time consuming and results in inaccuracies in locations of the welds.

As a specific example, an operator may be called upon to first secure a plurality of studs in equiangularly spaced relation about a six-inch diameter bolt circle and thereafter be required to secure a larger or smaller number of studs in equiangularly spaced relation about an eighty-eight inch diameter bolt circle on another workpiece.

In setting up for such operations there are several critical dimensions which must be accurately established.

First, the concentricity of the workpiece with respect to the rotary workpiece support table despite variations in the diameter of the central holes in the workpiece. The present invention solves this problem by providing a common accurately positioned centering stud on the workpiece support table and a plurality of workpiece centering discs each provided with a center hole dimensioned to snugly interfit with the shank of the centering stud and a cylindrical periphery accurately machined in concentric relation with the center hole and dimensioned to snugly interfit with the center hole of one size of workpiece to thereby accurately and easily concentrically position each workpiece on the rotary work regardless of the size of its center hole.

Second, the space between the center of the workpiece and the center of the stud welding gun chuck must be accurately established as equal to the radius of the bolt circle. The present invention facilitates this by providing flexibility in the positioning of the stud gun and in effect permitting micrometer like adjustments of the position of the welding gun after the heavy workpiece support fixture has been positioned with reasonable accuracy.

Third, the circumferential spacing of the studs about the bolt circle must be accurately established. In the present invention, this problem is reduced to one of merely mentally determining the desired angular spacing and setting a selector dial accordingly thereby completely eliminating variations in the angular spacing of the studs inherent in manual operation.

Fourth, the annular band of workpiece at the bolt circle must be maintained in a common plane while the studs are being welded thereto despite the pressure exerted on the workpiece by the weld gun and despite wide variations in the diameter of the bolt circles from workpiece to workpiece. The present invention solves this problem first by providing interchangeable rigid work support table plates and secondly by subjecting the workpiece to force in opposition to and which substantially balances the force of the welding gun during the time the weld is being performed thereby preventing distortion of the workpiece by weld gun loading. This is accomplished through a ground electrode which also assures a low resistance direct welding current path through the workpiece which prevents damage to the workpiece support bearings due to flow of welding current therethrough and more effective welding.

Essentially, therefore, the primary objects of this invention are to solve the foregoing problems in the manner indicated above.

Other or more specific objects of this invention are to provide:

(1) A self-indexing rotary table capable of semiautomatically indexing and positioning a single size or variety of sizes of workpieces through a succession of predetermined work stations with great accuracy and speed, (2) A novel pneumatic system for positioning a stud welding gun which, during the weld cycle, maintains the weld stud in proper electrical contact with the workpiece during the weld cycle and provides a secure electrical ground at the workpiece to protect the operator and machinery from the high amperage weld current and which, after the welding cycle, uses an integral reserve pressure accumulator to supply an additional pressure increment needed to effect the release of the weld gun from the workpiece, (3) A novel universally mounted welding gun, (4) An indexing mechanism which will rapidly and accurately index and position a workpiece in successive steps through the work station of a stud welder, percussion welder, punch press, milling machine, and the like.

(5) Semiautomatic means of indexing and positioning the workpiece comprised of a rotary indexing table, electrical means of turning the table about its vertical axis, means of locking the table at a predetermined position, this desired location being defined in terms of angular displacement of the workpiece (attached to the indexing table) from the preceding work station, (6) Means of electrically defining the displacement of the indexing table and workpiece in terms of angular degrees of rotation, these means consisting of a notched dial wheel geared to the indexing table and driven by an electric motor, a microswitch positioned to make and break electrical contact by engagement and disengagement of the notches of the dial wheel, and an electrical counter which counts the electrical contacts made by the microswitch to define angular displacement of the indexing table and which controls energization of the electric motor by means of a brake-clutch arrangement, (7) An indexing mechanism capable of being readily adjusted or programmed to a plurality of successive work stations by means of an electrical pulse counter which can be set to determine and control angular displacement of the workpiece between adjacent work stations, and which is capable of adjustment to any desired angularity between adjacent work stations in predefined increments within the range of the electrical counter, and (8) A novel pneumatic circuit to control the upward and downward movement of the stud gun; to forceably maintain a good electrical pressure contact of the stud against the workpiece; to store the air displaced from the gun carrying air cylinder in an air accumulator thereby increasing the preset air pressure within the accumulator, this increased and stored air supply to be later utilized to affect release of the stud gun from the welded stud; and to provide a proper electrical ground at the workpiece to shunt the high amperage welding current away from the self-indexing rotary device.

These and other objects and novel features of the present invention will become more fully evident or will be specifically pointed out in the appended claims and as the following description proceeds in connection with the accompanying drawings in which:

FIGURE 1 is a side elevation of a stud welding tool embodying the novel workpiece indexing mechanism and welding gun positioning pneumatic circuitry in accord with the present invention;

FIGURE 2 is a fragmentary view of the stud welding fixture taken substantially along line 2—2 of FIGURE 1 illustrating the mounting of certain of the components of the welding gun positioning pneumatic circuitry;

FIGURE 3 is an elevational view of the workpiece indexing rotary table and the brake-clutch controlled electric motor drive therefor taken substantially along line 3—3 of FIGURE 1;

FIGURE 4 is a fragmentary top plan view of the connection between the workpiece table and the drive motor therefor illustrating the associated impulse generator;

FIGURE 4A is a detailed sectional view taken along line 4A—4A of FIGURES 3 and 4 illustrating the pulse generator;

FIGURE 5 is an electrical schematic diagram of the impulse counter and control circuitry for the brake-clutch regulated electric motor drive;

FIGURE 6 is a schematic diagram of the pneumatic circuitry for positioning the stud welding gun and associated ground contact; and FIGURE 7 is an exploded view illustrating in detail the removable master mounting plate assembly of the workpiece carriage.

Similar reference numbers are applied to corresponding parts throughout all views.

The workpiece indexing mechanism has been illustrated herein in an improved stud welding tool as a preferred embodiment but it is to be recognized and understood that the indexing mechanism may be also employed with other tools wherein regulated indexing movement is desired.

With particular reference to FIGURE 1, stud welding fixture 10 comprises a base casting 11, supporting a vertical column 12, a carriage 13, vertically and pivotally adjustably mounted on column 12 and a tool carrying ram 14 mounted for longitudinal movement on carriage 13 all substantially as shown in United States Patent No. 2,312,356, issued Mar. 2, 1943, to W. F. Ocenasek for Radial Saw. Fixture 10 is rigidly mounted on a caster supported table 15. At its tool supporting end, ram 14 is provided with a pair of relatively rotatably adjustable bearing plates 16 and 17, plate 16 being fixed to the end of ram 14 and plate 17 being clamped thereto. A tool holder rod 18 extends through and is clamped in a split collar 19 fixed to plate 17. The holder 18 is adjustable within collar 19 for 360° about its vertical axis. Welded to the holder 18 is a metal plate 21 and attached thereto by means of bolts are brackets 22 which support gun carrying air cylinder 24. Air cylinder 24 possesses a double acting piston 25 and is positioned such that piston rods 26 and 27 extend vertically and coaxially therefrom. The ends of rods 26 and 27 are threaded such that a metal bracket 28 may be fixed thereon by nuts. Affixed to metal bracket 28 is a conventional production type stud welding gun 30. As will later be explained in more detail, vertical movement of welding gun 30, up and down, is directly related to the movement of and controlled through the double acting piston 25 of air cylinder 24.

Mounted on a bracket and plate arrangement 32 are several components of the novel pneumatic circuit 34 which, as shown in FIGURE 2, consists of two air regulators 36 and 38, two strainers 40 and 42, and two lubricators 44 and 46. As is shown in FIGURES 1 and 6, circuit 34 additionally consists of stud gun chuck release fluid pressure accumulator 48, a ground lead clamping air cylinder 50, and the aforementioned stud gun carrying air cylinder 24. The components mounted on plate 32 and accumulator 48 may be mounted on carriage 13 or ram 14 as shown. A detailed description of this novel air circuit will be given subsequently in conjunction with the schematic diagram illustrated by FIGURE 6.

A rotary workpiece support table 49 is slidable along tracks (not shown) grooved longitudinally in the upper face of the fabricated steel table 15 toward and from fixture 10. This allows the table 49 to be selectively positioned on and clamped to table 15 at any bolt circle radius required. Attached to the rotary table 49 is a master mounting assembly 52 and a clamp like holding adaptor which utilizes variously sized mounting plates 53 upon which workpieces 54 of various sizes may be accurately and securely mounted. The master mounting assembly 52 will be described in detail subsequently in conjunction with FIGURE 7.

In FIGURE 1, a stud 56 is shown disposed between the tip 58 of weld gun 30 and the workpiece 54, ready for the welding operation. A control cabinet 62 which houses part of the electrical control equipment is shown mounted upon the bottom section 66 of table 15 beneath base 11. Its operation is initiated by depression of the operator's foot trip switch 64 as will be explained presently.

In order to protect the bearings of the rotary table from the high amperage welding current, it is necessary that a solid ground on the workpiece be provided as close to the stud being welded as is practical. In the present invention this is accomplished by mounting the ground clamping air cylinder 50, which has double rod ends, a one inch stroke and a spring return, on a mounting plate 51 (FIGURE 1) which can be moved longitudinally on the steel plate table 14 to the desired position. Fastened to the upper end of the piston rod 63 is a copper bar 55 carrying a ground lead 57 at one end and a contact button 59 on the opposite end.

With particular reference to FIGURES 3, 4 and 4A, indexing rotary table 49 is supported for rotation about a vertical axis and rotated by means of a splined input shaft through a worm and worm wheel gear mechanism (not shown) internally housed in the base of the rotary table 49. The ratio of the gear mechanism is 120:1; thus one complete revolution of the input shaft produces a 3° rotation of the rotatable indexing table 49. In the prior art practice, the input shaft was rotated manually and the operator, by means of a graduated dial and reference marker on the side of the table base, positioned the table to each desired angular displacement as accurately as he could.

In the present invention the input shaft for the gear mechanism driving the table 49 is a semiautomatic drive which will position the table at a faster rate and with greater accuracy than could be accomplished by the manual drive it has replaced. For this purpose, a notched dial wheel or cam 66 is splined to the input shaft of the worm gearing. This input shaft is connected by a universal joint 68 to the output shaft 69 of a combined alternatively operative brake and clutch unit 70. The input shaft 71 of unit 70 is driven through standard coupling 72 by a unidirectional nonsynchronous electric motor 74. The brake and clutch unit 70 and the motor 74 are welded or bolted to angle iron 76 which is fixed to and movable over table 15 with the base of rotary table 49 being welded thereto at 78.

The dial wheel or cam 66 (illustrated in more detail in FIGURES 4 and 4A) has six equally spaced and equal length slots 80 milled into this periphery such that the arc length of the slots 80 equals the arc length of the lands or lobes 82. The slots 80 are of ample width to clear cam follower roller 84 of microswitch 86 as shown at 88 in FIGURE 4. Microswitch 86 is mounted so that its roller 84 will alternately engage the slots 80 and the lands 82 on the circumferential periphery of the dial wheel or cam 66 as it rotates thus pivoting arm 90 back and forth about pivot 92 to make and break electric contact. Thus the microswitch 86 opens and closes once for every 60 degrees of rotation of cam 66 and the input shaft. Since the interconnecting gear ratio of the input shaft to the rotary table 49 is 120:1, the contacts of switch 86 open and close once for every ½ degree rotation of the rotary table 49. The stated ½ degree increment is, of course, a function of the number of slots in the dial wheel 66. Thus other sized increments are readily attainable by merely varying the number of slots positioned around the dial wheel circumference. For example, twelve slots would give a ¼ degree increment, etc.

As is shown in FIGURE 5, the microswitch 86 is connected in series with the count or actuating coil of a selectively settable reset counter 96 mounted in control cabinet 62 as is shown in FIGURE 1. In the preferred embodiment, this counter 96 has a maximum total count capacity of 400, being an Eagle Model HZ 40A6 (arrangement A242). The count coil of counter 96 is energized in response to each of the electrical pulses generated by closure of microswitch 86. FIGURE 5 is a schematic diagram of all of the electrical equipment related to control and operation of the semiautomatic self-indexing rotary table 49.

The operation of the table by the control equipment is as follows. Remembering that the counter 96 receives from microswitch 86 one impulse for each ½ degree displacement of the rotary table 49, it is possible to program the counter for any magnitude of angular displacement in terms ½ degree increments of rotation about its vertical axis within the range of the counter 96. For example in a twelve hole bolt circle consisting of twelve equally spaced holes, the angular separation between centers of adjacent holes will be 30 degrees; or in terms of the counter, sixty (½°) counts apart. Thus the counter 96 would be set for sixty counts for this particular workpiece. Selection of the desired count for counter 96 is made by rotary adjustment of dial 65 (FIGURE 1).

The preferred counter utilized by the prototype is of an automatic reset type, in that, as it receives impulses from microswitch 86, it gradually progresses to the preselected maximum setting and returns to a zero setting after each complete weld cycle, resetting itself for the next cycle of operation to be initiated by depression of foot switch 64 by the operator. The only time the counter need be reset is when the number of pulses to be counted, i.e., the degree of rotation, is changed.

Once the counter dial 65 (FIGURE 1) has been set to the desired count, and the main switch 100 (FIGURE 5) closed, the following events occur simultaneously:

(1) The unidirectional motor 74 (FIGURES 3 and 5) is energized and starts to rotate;

(2) Rectifier 102 of control unit circuit 95 for the brake-clutch unit 70 is energized imposing an electric potential across brake coil 104 through the normally closed contacts 106 of load relay 108.

The energizing of brake coil 104 through contacts 106 of load relay 108 prevents transmission of the torque energy reveloped by the electric motor to the gear train of the rotary table 49, thereby locking the rotary table in position. Load relay 108 has two sets of contacts 106 and 112, one normally open and the other normally closed, and used respectively to control the alternative energization of the brake coil 104 and clutch coil 114 of the brake and clutch drive unit 70. At this point in the operation sequence, neither the coil of the counter 96 nor the load relay 108 are energized.

Next foot switch 64 is momentarily closed. This causes the following events to occur simultaneously:

(1) The relay coil 116 is energized closing its normally open contacts 118 and 120;

(2) The closing of contacts 118 provides a hold circuit for the coil 116, its function being to lock this coil into the circuit allowing the operator to release foot switch 64 without interrupting operation of the counter;

(3) The closing of contacts 120 energizes load relay 108 causing contacts 106 to break contact deenergizing the brake coil; and causing contacts 112 to make contact and energize clutch coil 114. The potential across the clutch coil may be varied or adjusted as necessary by potentiometer 105;

(4) With the release of the brake and engagement of the clutch in brake and clutch unit 68, torque energy is transmitted through to the gear train of the rotary table causing the table 49 to rotate;

(5) The torque transmitted by drive motor 74 also causes dial wheel or cam 66 to rotate, opening and closing microswitch 86. Since the contacts of switch 86 are electrically connected in series with the pulse sensing counter coil 122 of counter 96, the counter will advance six times for each revolution of the drive shaft 69 (FIGURE 3).

As soon as the pulse count reaches the predetermined value, as represented by the dial counter setting of sixty in our example, the contacts 118 and 120 of relay 116 are mechanically opened. This results in the simultaneously deenergization of the counter clutch coil 116 and load relay coil 108. The counter 96 is automatically reset to zero upon deenergization of the counter clutch coil 116 and is thus ready for the next cycle of operation. Deenergization of the load relay 108 causes contacts 112 to open and release the main drive clutch; and causes contacts 106 to close setting the brake and locking the rotary table in position for the weld operation.

Upon completion of the weld cycle, workpiece 54 can be positioned to the next programmed work station simply by depressing the operator's foot switch 64 again.

Accuracy of this semiautomatic indexing table is ±2 minutes of arc for every ½° increment and also over the total 360° of table rotation. One complete revolution of the rotary table by these means requires a minimum of one minute and 50 seconds.

Theh novel air circuit embodied in the invention will be described with particular reference to FIGURE 6. Line air from a suitable source of compressed air enters into the circuit through two-way valve 124 passing through the valve to T-connector 126 where the air branches through to air hoses 128 and 130 which direct it to filter-regulator assemblies 132 and 134, respectively. Filter-regulator assembly 132 consists of air regular 36, strainer 40, and lubricator 44. Filter-regulator assembly 134 consists of air regulator 38, strainer 42, and lubricator 46. These two assemblies provide a means of straining and cleaning incoming air, and a means of independently regulating the pressure from each of the assemblies to the remainder of the system, the pressure output setting for regulator 38 being substantially higher than that for regulator 36.

Hose 136 from lubricator 44 of filter-regulator assembly 132 connects to T-connector 138, the vertical leg of the T connecting to the fluid pressure accumulator 48 and the other horizontal leg of T-connector 138 connecting through air hose 140 to the lower end of the gun carrying air cylinder 24, hereafter referred to as the gun cylinder.

Hose 142 from lubricator 46 of filter-regulator assembly 134 is connected to the inlet of a three-way air valve 144. One outlet port of air valve 144 is connected to the upper end of gun cylinder 24 through a conduit 145 and the two horizontal legs of T-connector 146. The vertical leg of connector 146 routes air from valve 144 through needle valve 148 and air hose 150 to the lower end of the ground clamping cylinder 50. When the ported plug of valve 144 is rotated in one direction line 142 is connected to line 145. When it is rotated in the opposite direction, this connection is terminated and line 145 is connected through valve 144 to atmosphere to vent cylinder 50 and the upper half of cylinder 24.

The volume of the accumulator 48 is approximately twice that of the lower half of the gun cylinder 24 when fully expanded. The purpose of the accumulator is to act as a nonlinear air spring. With line 145 vented to atmosphere, line air, at a first and relatively low pressure, is introduced into the accumulator 48, line 140 and the lower half of cylinder 24 by filter-regulator assembly 132. Air valve 144 is connected to gun cylinder 24 as though it were a single acting, return type spring. When air valve 144 is opened to interconnect lines 142 and 145, the introduction of additional air under a second and higher pressure into the upper end of gun cylinder 24 and into cylinder 50 from filter-regulator assembly 134 forces piston 25 downwards and the ground contact 59 upwards pushing the stud gun 30 (FIGURE 1) towards and against workpiece 54 until the stud and workpiece are securely forced together.

Air regulators 36 and 38 are non-unloading type regulators, i.e., they do not allow the compressed air downstream from them to release or unload when it exceeds the set pressure. Thus when the piston 25 of gun cylinder 24 being forced downward, the air contained in the lower portion of the gun cylinder is forced out from the cylinder through air hose 140 into accumulator 48 where it is stored thereby raising the internal pressure of air within the accumulator 48 to a magnitude determined by the pressure in line 142 and the relative areas of the opposed faces of piston 25.

It takes more force to pull the stud gun free from the welded stud on the return stroke than to move the stud gun into contact with the workpiece, this higher pressure is provided to help break the stud gun free from the workpiece. As piston 25 and the stud gun move upwardly, pressure within the accumulator returns to the normal pressure set by the air regulator 36. By correct adjustment of the air regulator 36 as pressure setting can be achieved which will furnish just enough additional force to release the stud gun from the stud after termination of flow of electrical welding current and which, as the pressure decreases, allows the gun to end its upward travel in a smooth manner. The exact pressures can be determined by trial and error for any given size of stud and recorded for reference.

Line air is piped to the ground clamp cylinder 50 from filter-regulator assembly 134 through air valve 144 and the vertical leg of T-connector 146 which routes air to the lower end of the ground clamp cylinder through air hose 150. Needle valve 148 is inserted between the three-way air valve 144 and the ground clamping cylinder to allow for adjustment of the rate of flow in order to provide for a good electrical contact of contactor 59 to the workpiece. The sequencing of operation is such that depression of the actuating lever for air valve 144 (FIGURE 6) causes the ground contact 59 (FIGURE 1) to be made at the workpiece 54 before the stud gun 58 comes in contact with the stud 56. Thus a solid ground connection is always assured at the workpiece through which the welding current may be shunted away from the rotary table.

In the normal course of production, a great variety of sizes of circular plates serve as workpieces. For example, in one instance studs may have to be welded to a plate having a bolt circle diameter of only six inches whereas in the next instance a plate having a bolt circle diameter of eighty-eight inches may well be the workpiece. The problem of accurately and securely mounting these various size workpieces to the rotary table was resolved by the novel master mounting plate assembly 52 constructed in the following manner. With particular reference to FIGURES 3 and 7, assembly 52 includes a master mounting plate 152 formed of a fourteen-inch diameter ¼ inch thick steel plate with four equally spaced slots extending radially from its center which coincides with four similarly disposed T slots in the topmost surface of rotary table 49. A tapped steel plug 154 is welded to the underside of the plate 152 and is of such a diameter as to just fit the center locating hole in the rotary table 49. Centered and welded to the topside of the plate is the master mounting pipe or collar 156. The plate in this form is bolted to the top of the rotary table 49. Fabricated to fit into collar 156 are variously sized removable mounting plates 158, each of which will serve to support several different sizes of workpieces. Centered and welded to the underside of each removable plate 158 is a locating plug 160, the outside diameter of which is sized to fit snugly within the master mounting collar 156. A selected size removable mounting plate 158 is assembled with the master mounting plate 152 as shown in FIGURE 3 and the workpiece 54 is placed upon the removable plate 158. As most of the workpieces have large center holes, close fitting center plates 162 for the various sized workpiece holes are provided. These three plates are then secured together by a clamp bar 164 through which is inserted a threaded clamp bolt 166 sized to extend through this holding assembly to and through the tapped plug 154 attached to the underside of the master mounting plate 152. As can be seen fabrication of the various sized adaptors to anticipate and meet production workpiece mixes is relatively simple.

The sequential operation of the complete machine is now related. The correct size mounting plate 158 is installed on the rotary table 49 and the workpiece is clamped down. A dummy weld stud with a pointed end is inserted into the chuck of stud gun 30. The rotary table 49 is moved over the top surface of table 15 toward the gun and a tape measure is used to determine the required bolt circle radius as measured between a center mark on the clamping through-bolt 166 and the pointed end on the dummy stud. The rotary table 49 is then clamped in place at table 15 and the final measurement adjustment is made by moving the radial drill press ram 14 to the correct position along carriage 13.

The ground clamping air cylinder 50 is positioned such that the contact button 59 is adjacent to and directly beneath the welding point, thus defining the work station through which the workpiece 54 is to be moved in steps. The dummy stud is now removed and replaced by the required welding stud 56. The counter dial 65 is then set for the required stud spacing and the main switch 100 is closed. The air valve 144 is opened, pushing the stud against the workpiece 54. The firing button (not shown) is pressed and the stud 56 is welded to the workpiece 54. The gun 30 is retracted by venting the upper half of cylinder 24 to atmosphere thereby releasing the reverse pressure of accumulator 48. The foot switch 64 then is depressed to start the table 49 indexing to the next position during which time a new stud is inserted in the gun 30. This procedure is then repeated as needed to complete the particular job requirements.

Accuracies of ±2 minutes of arc with regards to angular displacement and a perpendicularity of ±½ degree normal to the place of the workpiece are readily attained by use of the present invention, both accuracies being more precise than that which is attainable with the hand layout, center punch and hand gun method, and attainable with much less time and labor expenditures.

It is noted for comparison purposes that, in the earlier mentioned hypothetical twelve-stud situation, only the initial stud location measurement is performed manually, the indexing mechanism performing all other measurements within the above stated accuracy limits tending to cancel out errors in the intial angular displacement. By the old hand layout, center punch, hand gun method, all twelve measurements are completely dependent upon the human factors associated with the operator's skill.

To weld studs in a linear manner, the indexing is turned off and the workpiece is either clamped or mounted in a vise secured to the regular drill press table 15. The ram 14 is then reversed and the stud gun 30 is positioned by the combined rotary and linear ram movement about the axis of column 12 and along the carriage 13, respectively. By use of guage points it is possible to greatly speed up the welding of studs on duplicate parts, and due to the universal positioning of the ram 14 it is possible to weld studs in 360° position in the horizontal plane of the workpiece.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed and desired to be secured by Letters Patent is:

1. A stud welding machine comprising:
   (a) A work support fixture having a rotatable carriage adapted to support centrally apertured disc-like workpieces of a variety of internal and external diameters;
   (b) A base;
   (c) Means mounting said fixture for movement over said base and for securing said fixture to said base in a selected position;
   (d) A stud welding gun;
   (e) Pneumatic motor means for moving said gun toward and from a workpiece supported by said fixture;
   (f) Means mounting said motor means on said base for movement about a first axis parallel to the rotation axis of said fixture and for longitudinal movement along a second axis normal to said first axis;
   (g) Power means operative when actuated to rotate said carriage through a preselected angle whereby like circumferentially spaced portions of such a workpiece can be successively aligned with said welding gun;
   (h) A first pneumatic means biasing said motor means to the inoperative limit position of said gun;
   (i) A second pneumatic means selectively operative to overcome the biasing force of said first pneumatic means and activate said motor means to the operative position of said gun;
   (j) A third pneumatic means operative with said second pneumatic means for preventing workpiece distortion under the influence of said motor means and said gun; and
   (k) Means associated with said third pneumatic means for preventing welding current flow from said gun through said fixture.

2. A rotary workpiece support for disc-like workpieces comprising a rotatable table, an upwardly extending collar rigidly coaxially fixed to said table, a rigid disc having a diameter slightly less than the diameter of the disc-like workpiece to be supported, said disc having a central coaxial hub depending therefrom and adapted to snugly interfit within the internal bore of said collar so that said disc is rigidly maintained in coaxial relation with said collar and rigidly supported at a predetermined elevation above and in a plane perpendicular to the axis of said rotatable table, said disc having a coaxial opening, said collar having fixed thereto a member providing a coaxial threaded opening substantially equal in diameter to the diameter of the opening through said disc, a circular plate having an external diameter selected to interfit snugly with the central opening of a workpiece to be mounted on said disc and a coaxial opening substantially equal in diameter to the diameter of the opening through said disc, a clamping bar adapted to overlie and engage a workpiece on said disc, said clamping bar having a centrally located through opening substantially equal in diameter to the diameter of the opening through said disc and said circular plate, and a through bolt having an elongated shank threaded at one end to engage the threaded aperture in the member fixed to said collar and a cylindrical portion adapted to extend through and diametered to snugly interfit with the central openings in said disc, said plate and said clamping bar whereby said bolt, said disc, said plate and said clamping bar, when assembled with a workpiece, rigidly clamp such a workpiece in coaxial alignment with said collar and the axis of rotation of said table, said disc and said plate being interchangeable with like discs and plates of differing external diameters to accommodate workpieces having different external diameters and different diameter central openings.

3. In a stud welding machine, a welding head, a double acting piston type fluid motor, for moving said welding head toward and from a workpiece, a source of pressurized fluid, a pair of pressure regulators having their input connected to said source and providing respectively a first and relatively low output pressure and a second and relatively high output pressure, means permanently connecting one side of said fluid motor to said relatively low pressure output, a fluid pressure accumulator connected to said last named means so that said one side of said fluid motor is subjected to a fluid pressure at least equal to said relatively low fluid pressure throughout its entire range of travel, and means for selectively connecting the other side of said fluid motor for selectively connecting the other side of said fluid motor to said relatively high pressure output so that, when said fluid motor other side is so connected to said relatively high fluid pressure output, the piston thereof moves toward said one side to move said welding head toward the workpiece and to expel fluid therefrom through said first connecting means into said fluid pressure accumulator, and means for terminating the connection between said fluid motor other side and said relatively high pressure output and for venting said fluid motor other side to a pressure less than said relatively low pressure output whereby said welding head is disengaged from the stud welded to the workpiece and the piston of said fluid motor is restored toward said fluid motor other side initially under the influence of the high pressure derived from said fluid pressure accumulator.

4. In a machine for welding a plurality of studs about the periphery of disc-like workpieces, a workpiece support adapted to support a disc-like workpiece for rotation about a predetermined axis, a movable welding electrode and a movable ground electrode disposed on opposite sides of the path of movement of such a workpiece when on said support, and means for forcing said electrodes against opposite sides of such a workpiece so that such a workpiece is not distorted from its normal form during the welding operation incident to the pressure applied thereto through said welding electrode.

5. In a machine for welding a plurality of studs about the periphery of disc-like workpieces, a workpiece support adapted to support a disc-like workpiece for rotation about a predetermined axis, a movable welding electrode and a movable ground electrode disposed in opposite sides of the path of movement of such a workpiece when on said support, and means for forcing said electrodes against opposite sides of such a workpiece prior to initiation of and during welding current flow between said electrodes so that the current flow path between said electrodes is isolated from said workpiece support.

6. In a machine for welding a plurality of studs about the periphery of disc-like workpieces, a workpiece support adapted to support a disc-like workpiece for rotation about a predetermined axis, a movable welding electrode and a movable ground electrode disposed in opposite sides of the path of movement of such a workpiece when on said support, and means for forcing said electrodes against opposite sides of such a workpiece prior to initiation of and during welding current flow between said electrodes so that the current flow path between said electrodes is isolated from said workpiece support and so that such a workpiece is not distorted from its normal form during the welding operation incident to the pressure applied thereto through said welding electrodes.

References Cited

UNITED STATES PATENTS

| 2,845,523 | 7/1958 | Ramson | 219—98 |
| 2,959,074 | 11/1960 | Hallahan | 74—821 |
| 2,979,972 | 4/1961 | Danly | 74—821 |

FOREIGN PATENTS

| 968,374 | 9/1964 | Great Britain. |

RICHARD M. WOOD, *Primary Examiner.*

C. CHADD, *Assistant Examiner.*

U.S. Cl. X.R.

219—80